Oct. 8, 1929.                F. DE ROY                1,731,191
                            MINNOW TRAP
              Filed Oct. 22, 1928           2 Sheets-Sheet 1
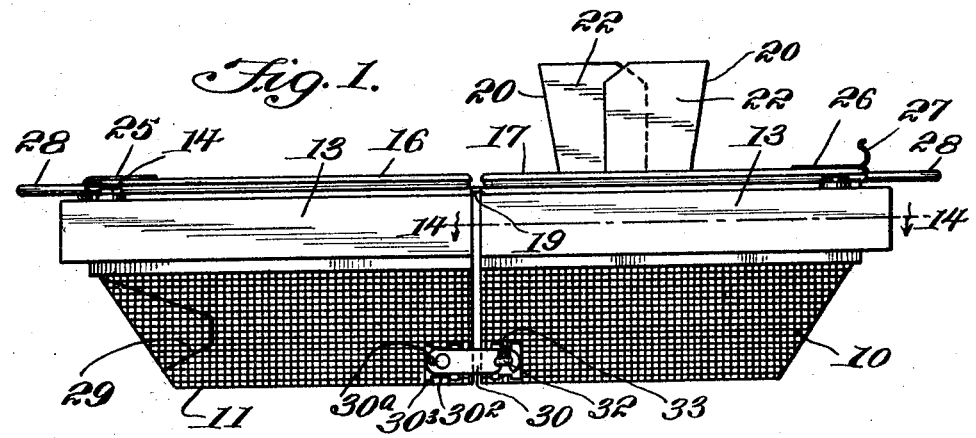
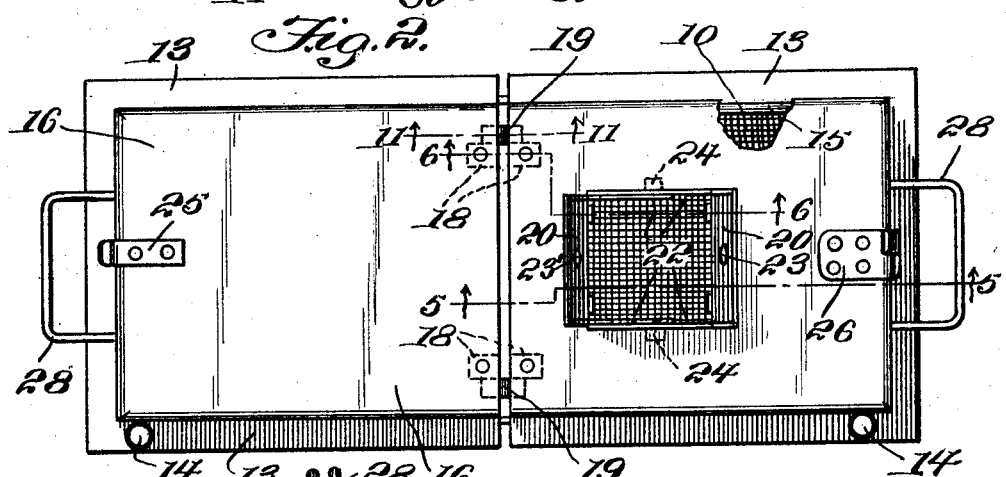
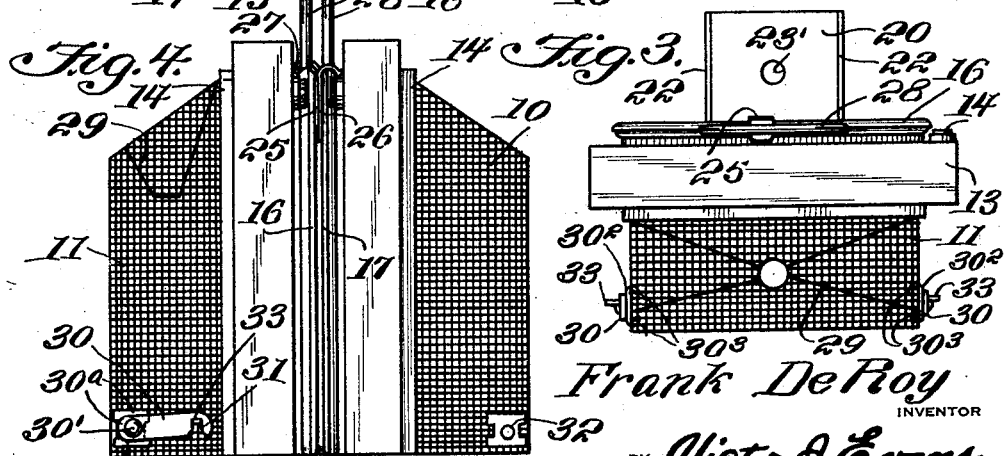
Frank De Roy, INVENTOR
BY Victor J. Evans, ATTORNEY
WITNESS: J. T. L. Wright

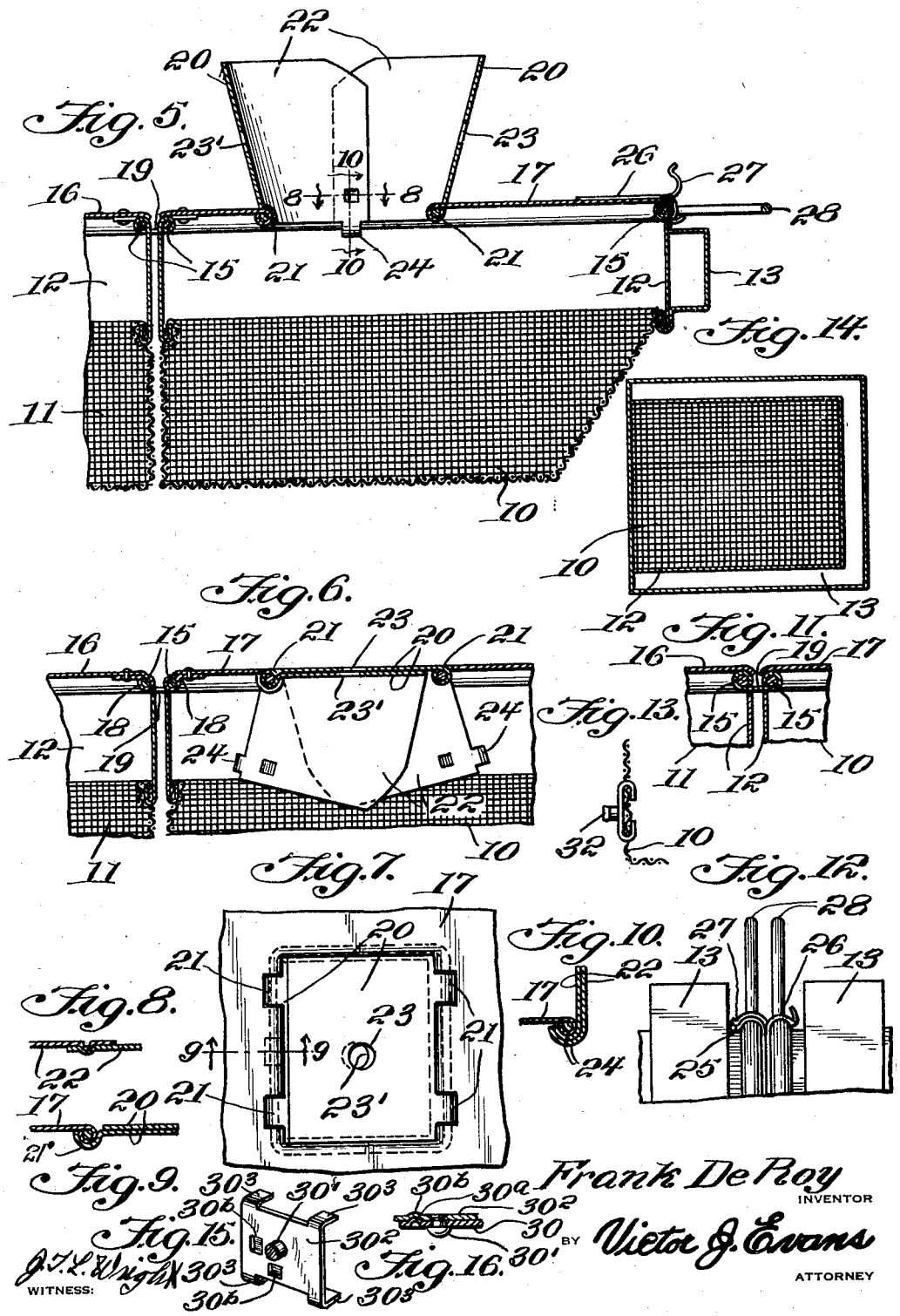

Patented Oct. 8, 1929

1,731,191

UNITED STATES PATENT OFFICE

FRANK DE ROY, OF ROUND BAY, MARYLAND

MINNOW TRAP

Application filed October 22, 1928. Serial No. 314,257.

This invention more particularly relates to improvements in minnow traps and bait boxes.

An object of the invention comprehends the provision of separate compartments for the trap and box.

Another object of the invention contemplates means for folding and lockingly retaining the compartments in their respective positions when submerged.

An additional object of the invention resides in the provision of buoyant members for the compartments whereby the bait may be kept alive.

A primary object of the invention consists of a closure entrance for the bait compartment.

With the above and other objects in view, the invention further consists of the following novel features and details of construction, to be hereinafter more fully described, illustrated in the accompanying drawings and pointed out in the appended claims.

In the drawings:—

Figure 1 is a side elevation of the invention.

Figure 2 is a top plan view thereof.

Figure 3 is an end elevation of the invention taken from the minnow trap end.

Figure 4 is a side elevation of the sections when folded and locked.

Figure 5 is a sectional view taken on line 5—5 of Figure 2.

Figure 6 is a sectional view taken on line 6—6 of Figure 2.

Figure 7 is a top plan view of the closure and entrance for the bait compartment.

Figure 8 is a sectional view taken on line 8—8 of Figure 5.

Figure 9 is a sectional view taken on line 9—9 of Figure 7.

Figure 10 is a sectional view taken on line 10—10 of Figure 5.

Figure 11 is a sectional view taken on line 11—11 of Figure 2 through the hinge connection between the compartments.

Figure 12 is a fragmentary elevation of the end portions of the compartments when folded and illustrative of the locking connection therebetween.

Figure 13 is a detail view taken through the side wall of one of the compartments and an attaching portion for a companionate element of a locking means joining the compartments.

Figure 14 is a sectional view taken on line 14—14 of Figure 1.

Figure 15 is a perspective view of the anchorage plate and mounting for the locking connection.

Figure 16 is a detail sectional view taken through the pivot connection for the locking mechanism.

Referring to the drawings in detail, wherein like characters of reference denote corresponding parts, the reference characters 10 and 11 indicate storage and trap compartments of a combination live bait box and trap therefor.

The lower portions of each of the compartments are formed of mesh wire whereas their upper portions are provided with solid side wall portions 12. Tanks 13, of U-shape formation, are curved upon the outer side walls of the walls 12 and which permit access thereto through plugs 14. The tanks may be sealed airtight by the plugs 14 to float same or the plugs may be removed to submerge the entire apparatus. Rails 15, upstanding from the upper perimeters of each of the compartments, carry closure members or doors 16 and 17 respectively, hingedly mounted on plate members 18. Plate members 19 afford the means of hinge connection between the respective compartments by looping the extremities thereof about the adjacent parallel portions of the rails 15, substantially as illustrated in Figure 11 of the drawings.

The closure member or door 17 is provided with a cut-out portion or portion removed and having the adjacent portions of closure members 20 hingedly connected, as at 21, thereto upon diametrically opposite sides thereof. Ears 21' carried upon the closure members are adapted to engage the under side of the door or closure 17 to limit downward and inward swinging movement of the closure members 20 whereby the latter may repose in the Figure 6 position when closed. Flanges 22, depending from the side edges of the closure plates 20, are adapted for overlapping relation and locking engagement by stud and depression connection as shown in Figure 8 of the drawings. A complete funnel is provided by the closure plates 20 and the flanges therefor and which may be left in such position to permit insertion of the hand or a dip net when it is desired to remove live bait from the compartment. The detail sectional view Figure 10 taken through the overlapping portions of the side flanges 22 for the closure plates 20 discloses an additional means of sustaining the plates 20 in elevated position. The closure plates 20 are further provided with openings 23 and 23' respectively arranged in staggered relation, as manifest from the illustration of the invention in Figure 7 of the drawings, whereby the finger may be inserted within the openings to engage the underside of the uppermost of the closure to facilitate opening of the funnel. The detail is in the nature of curved lips or ears 24 arranged upon the lower side edges of the flanges beneath the marginal edges of the opening in the door or closure 17 whereby upward and outward swinging movement of the closure plates 20 will be restricted in addition to assuring proper engagement of the stud and depression connections between the flanges.

Spring fingers 25 and 26, carried upon the outermost ends of the doors or closure plates 16 and 17 repectively, are adapted to be bent over the ends of the rails 15 in the manner illustrated in Figures 5 and 12 of the drawings. An auxiliary spring finger 27, projected from the spring finger 26, is adapted to engage the spring finger 25 when the compartments are swung upon the hinge plates 19 therebetween. Handles 28 are projected from the rails 15 and which provide a convenient method for carrying the combination storage and minnow trap.

A trap entrance 29, of frusto-conical shape, is provided in the end of the trap compartment 11 to guide mad toms and other minnows within the compartment.

A locking plate 30, swingably mounted upon the outer side of the compartment 11 and upon a trunnion 30' projected from a plate member 30² having attaching ears 30³ projected through and bent upon the mesh, is provided with a cut-out portion 31 within its free end adapted to selectively accommodate a headed stud 32 included upon the adjacent outer side of the compartment 10 whereby the two compartments may be lockingly retained in the position shown in Figure 1 of the drawings when same are floating or submerged. The funnel shaped entrance for the compartment 10 will admit air and light thereto and due to the height thereof will prevent the bait from jumping out.

As illustrated in Figures 15 and 16 of the drawings, the pivoted end of the lever 30 is provided with projections or embossed portions 30ᵃ adapted for selective engagement within depressions 30ᵇ in the attaching plate 30² to rigidly retain the lever in free or locked positions.

A gripping element 33, outwardly projecting from the locking end of the lever 30, is adapted to repose upon the upper side of the headed stud 32 when the lever occupies the Figure 1 position.

The invention is susceptible of various changes in its form, proportions and minor details of construction, and the right is herein reserved to make such changes as properly fall within the scope of the appended claims.

Having thus described the invention, what is claimed is:—

1. A storage and minnow trap comprising multiple compartments having closure lids, means for establishing hinge connections between the adjacent portions of the compartments, a locking element for the compartments to sustain same in end to end relation, spring fingers carried by the closure lids adapted to be sprung one upon the other when the compartments are swung upon said hinges, and handles projected from the outermost ends of each of the compartments.

2. A bait box comprising a compartment having a closure lid, a tank carried by the compartment adapted to float and submerge same, closure plates hingedly mounted upon the closure lid within an opening in the latter, flanges depending from the side edges of each of the closure plates and arranged in overlapping relation, and means for sustaining the closure plates and flanges therefor in elevated positions.

3. A bait box comprising a compartment having a closure lid, a tank carried by the compartment adapted to float and submerge same, closure plates hingedly mounted upon the closure lid within an opening in the latter, flanges depending from the side edges of each of the closure plates and arranged in overlapping relation, lips laterally projected from the lowermost ends of the flanges and having contact with the under side of the closure lid, and lug and depression connections between the overlapping portions of the flanges.

In testimony whereof I affix my signature.

FRANK DE ROY.